United States Patent
Kangastupa et al.

(10) Patent No.: US 11,850,679 B2
(45) Date of Patent: Dec. 26, 2023

(54) LASER PROCESSING APPARATUS AND METHOD

(71) Applicant: Corelase Oy, Tampere (FI)

(72) Inventors: Jarno Kangastupa, Tampere (FI); Arto Salokatve, Tampere (FI)

(73) Assignee: Corelase Oy, Tampere (FI)

( * ) Notice: Subject to any disclaimer, the term of this patent is extended or adjusted under 35 U.S.C. 154(b) by 810 days.

(21) Appl. No.: 16/763,237

(22) PCT Filed: Dec. 29, 2017

(86) PCT No.: PCT/FI2017/050959
§ 371 (c)(1),
(2) Date: May 12, 2020

(87) PCT Pub. No.: WO2019/129917
PCT Pub. Date: Jul. 4, 2019

(65) Prior Publication Data
US 2020/0306878 A1 Oct. 1, 2020

(51) Int. Cl.
*B23K 26/06* (2014.01)
*B23K 26/073* (2006.01)
(Continued)

(52) U.S. Cl.
CPC ...... *B23K 26/0604* (2013.01); *B23K 26/0734* (2013.01); *B23K 26/24* (2013.01);
(Continued)

(58) Field of Classification Search
CPC ........... B23K 26/0648; B23K 2101/18; B23K 2103/10; B23K 26/705; B23K 26/24; B23K 26/0734; B23K 26/0604
(Continued)

(56) References Cited

U.S. PATENT DOCUMENTS

| 4,642,446 A | 2/1987 | Pennington |
| 5,012,069 A | 4/1991 | Arai |

(Continued)

FOREIGN PATENT DOCUMENTS

| CN | 101077549 A | 11/2007 |
| CN | 101405635 A | 4/2009 |

(Continued)

OTHER PUBLICATIONS

Office Action and Search Report received for Taiwanese Patent Application No. 107145349 dated Jun. 9, 2022, 21 pages (11 pages of English Translation and 10 pages of official copy).
(Continued)

*Primary Examiner* — Jimmy Chou
(74) *Attorney, Agent, or Firm* — Morrison & Foerster LLP

(57) ABSTRACT

The invention concerns an apparatus and its use for laser welding. A laser welding apparatus comprise at least one first laser device, each providing at least one first optical feed fiber with a first laser beam; at least one second laser device, each providing at least one second optical feed fiber with a second laser beam; means for generating a composite laser beam comprising a first output laser beam and a second output laser beam for welding a workpiece; wherein the first output laser beam has a circular cross-section and the second output laser beam has an annular shape concentric to the first output laser beam. The second laser device is a fiber laser device or a fiber-coupled laser device. The apparatus is configured to form the second output laser beam at least on the basis of the second laser beam, and the second output laser beam comprises a first wavelength and a second wavelength having difference of at least 10 nanometers, or the second output laser beam has spectrum width of at least 10 nanometers.

15 Claims, 6 Drawing Sheets

(51) Int. Cl.
*B23K 26/24* (2014.01)
*B23K 26/70* (2014.01)
*B23K 103/10* (2006.01)
*B23K 101/18* (2006.01)

(52) U.S. Cl.
CPC ........ *B23K 26/0648* (2013.01); *B23K 26/705* (2015.10); *B23K 2101/18* (2018.08); *B23K 2103/10* (2018.08)

(58) Field of Classification Search
USPC .................................................... 219/121.76
See application file for complete search history.

(56) References Cited

U.S. PATENT DOCUMENTS

| | | | |
|---|---|---|---|
| 5,449,881 | A | 9/1995 | Nakata et al. |
| 5,684,642 | A | 11/1997 | Zumoto et al. |
| 5,694,408 | A | 12/1997 | Bott et al. |
| 6,037,968 | A * | 3/2000 | Emge ............... B23K 26/082 347/256 |
| 7,348,517 | B2 | 3/2008 | Egawa et al. |
| 7,615,722 | B2 * | 11/2009 | Govorkov .......... B23K 26/0613 372/101 |
| 8,399,803 | B2 | 3/2013 | Idaka et al. |
| 8,520,298 | B2 | 8/2013 | Maryfield et al. |
| 8,781,269 | B2 * | 7/2014 | Huber ................ B23K 26/064 385/18 |
| 9,620,925 | B2 | 4/2017 | Keen et al. |
| 9,656,349 | B2 | 5/2017 | Mori |
| 10,310,201 | B2 * | 6/2019 | Kliner ................ H01S 3/0064 |
| 2002/0050488 | A1 * | 5/2002 | Nikitin .............. B23K 26/0608 219/121.64 |
| 2002/0088784 | A1 | 7/2002 | Bertez |
| 2002/0198622 | A1 | 12/2002 | Dinauer et al. |
| 2003/0052102 | A1 | 3/2003 | Amako et al. |
| 2004/0200813 | A1 | 10/2004 | Alips et al. |
| 2005/0088654 | A1 | 4/2005 | Hu et al. |
| 2005/0094952 | A1 | 5/2005 | Gonthier et al. |
| 2006/0219673 | A1 * | 10/2006 | Varnham ........... B23K 26/0734 219/121.85 |
| 2006/0249491 | A1 * | 11/2006 | Jurgensen .......... B23K 26/0676 219/121.76 |
| 2007/0170157 | A1 | 7/2007 | Miyajima et al. |
| 2007/0278194 | A1 | 12/2007 | Hoelsher et al. |
| 2009/0154881 | A1 | 6/2009 | Salokatve |
| 2009/0188901 | A1 | 7/2009 | Dantus |
| 2009/0211700 | A1 | 8/2009 | Terada et al. |
| 2009/0266801 | A1 | 10/2009 | Oku et al. |
| 2010/0163537 | A1 | 7/2010 | Furuta et al. |
| 2011/0042361 | A1 | 2/2011 | Nowak et al. |
| 2011/0127697 | A1 | 6/2011 | Milne |
| 2011/0240617 | A1 | 10/2011 | Xu et al. |
| 2011/0293215 | A1 | 12/2011 | Ruggiero et al. |
| 2012/0074110 | A1 | 3/2012 | Zediker et al. |
| 2013/0073071 | A1 | 3/2013 | Culp |
| 2013/0148925 | A1 * | 6/2013 | Muendel ............ G02B 6/4216 385/27 |
| 2013/0223792 | A1 * | 8/2013 | Huber ................ G02B 6/262 385/127 |
| 2014/0010508 | A1 * | 1/2014 | Matsuo ............ G02B 6/02042 385/127 |
| 2014/0263208 | A1 | 9/2014 | Karlsen et al. |
| 2014/0305910 | A1 | 10/2014 | Gapontsev et al. |
| 2015/0121962 | A1 | 5/2015 | Jiang et al. |
| 2015/0321286 | A1 | 11/2015 | Heinemann et al. |
| 2015/0372444 | A1 * | 12/2015 | Keen .................. H01S 3/10 385/95 |
| 2016/0002088 | A1 | 1/2016 | Mizumura et al. |
| 2016/0039045 | A1 * | 2/2016 | Webster .............. B23K 26/14 356/450 |
| 2018/0147661 | A1 * | 5/2018 | Salokatve .......... B23K 26/22 |
| 2019/0118299 | A1 * | 4/2019 | Kangastupa ....... B23K 26/322 |
| 2019/0383998 | A1 * | 12/2019 | Kangastupa ...... G02B 6/02338 |

FOREIGN PATENT DOCUMENTS

| | | |
|---|---|---|
| CN | 101583456 A | 11/2009 |
| CN | 101647162 A | 2/2010 |
| CN | 101883658 A | 11/2010 |
| CN | 102169217 A | 8/2011 |
| CN | 102289078 A | 12/2011 |
| CN | 103056523 A | 4/2013 |
| CN | 103097931 A | 5/2013 |
| CN | 103472546 A | 12/2013 |
| CN | 103842124 A | 6/2014 |
| CN | 103842305 A | 6/2014 |
| CN | 203992814 U | 12/2014 |
| CN | 104334312 A | 2/2015 |
| CN | 104503099 A | 4/2015 |
| CN | 104955605 A | 9/2015 |
| CN | 105008085 A | 10/2015 |
| CN | 204790085 U | 11/2015 |
| CN | 105458493 A | 4/2016 |
| CN | 105974534 A | 9/2016 |
| CN | 106563880 A | 4/2017 |
| EP | 88501 A1 | 9/1983 |
| EP | 0464213 A1 | 1/1992 |
| EP | 1055945 A2 | 11/2000 |
| EP | 1813379 A1 | 8/2007 |
| EP | 1909366 A1 | 4/2008 |
| EP | 2071376 A1 | 6/2009 |
| EP | 2399703 A1 | 12/2011 |
| EP | 2722127 A1 | 4/2014 |
| EP | 2762263 A1 | 8/2014 |
| EP | 2859986 A1 | 4/2015 |
| FR | 2790689 A1 | 9/2000 |
| JP | 58-159514 A | 9/1983 |
| JP | 3-238184 A | 10/1991 |
| JP | 2000-351087 A | 12/2000 |
| JP | 2001-108869 A | 4/2001 |
| JP | 2001-138084 A | 5/2001 |
| JP | 2002-160083 A | 6/2002 |
| JP | 2002-224876 A | 8/2002 |
| JP | 2003305585 A | 10/2003 |
| JP | 2004-105972 A | 4/2004 |
| JP | 2004-154813 A | 6/2004 |
| JP | 2004-358521 A | 12/2004 |
| JP | 2007-9766 A | 1/2007 |
| JP | 2007-518566 A | 7/2007 |
| JP | 2007-196254 A | 8/2007 |
| JP | 2008105096 A | 5/2008 |
| JP | 2009-145888 A | 7/2009 |
| JP | 2011-227269 A | 11/2011 |
| JP | 2013-139039 A | 7/2013 |
| JP | 2013-180295 A | 9/2013 |
| JP | 5460917 B1 | 1/2014 |
| JP | 2014-18800 A | 2/2014 |
| JP | 2016503348 A | 2/2016 |
| JP | 2017185543 A | 10/2017 |
| JP | 2017-532607 A | 11/2017 |
| KR | 20030043425 A | 6/2003 |
| KR | 20130037679 A * | 4/2011 ......... G02B 27/0905 |
| KR | 10-2013-0037679 A | 4/2013 |
| KR | 20170041745 A | 4/2017 |
| KR | 20170104818 A | 9/2017 |
| TW | 201031953 A | 9/2010 |
| TW | 201237478 A | 9/2012 |
| TW | 201710009 A | 3/2017 |
| WO | 2007/007766 A1 | 1/2007 |
| WO | 2009/003484 A2 | 1/2009 |
| WO | 2009/077637 A1 | 6/2009 |
| WO | 2013/019204 A1 | 2/2013 |
| WO | 2014/118516 A1 | 8/2014 |
| WO | WO-2014138939 A1 * | 9/2014 ............ B23K 10/02 |
| WO | 2016/062914 A1 | 4/2016 |
| WO | 2016/198724 A2 | 12/2016 |
| WO | WO-2016198724 A2 * | 12/2016 ......... B23K 26/0096 |

OTHER PUBLICATIONS

Notice of Allowance received for Chinese Patent Application No. 201780098050.X, dated Jul. 6, 2022, 10 pages.

(56) References Cited

OTHER PUBLICATIONS

Notice of Allowance received for Korean Patent Application No. 10-2020-7019973, dated Jun. 22, 2022, 3 pages.
Decision to grant received for European Patent Application No. 16852879.2 dated Dec. 19, 2019, 2 pages.
European Search Report received for European Patent Application No. 16852879.2 dated Jun. 13, 2018, 4 pages.
Extended European Search Report received for European Patent Application No. 16923523.1, dated Aug. 7, 2020, 6 pages.
Final Office Action received for U.S. Appl. No. 15/518,510, dated Oct. 21, 2020, 38 pages.
Intention to grant received for European Patent Application No. 16852879.2 dated Oct. 29, 2019, 6 pages.
International Preliminary Report on Patentability received for PCT Patent Application No. PCT/FI2016/050519, dated Jan. 24, 2019, 11 pages.
International Preliminary Report on Patentability received for PCT Patent Application No. PCT/FI2016/050855, dated Jun. 20, 2019, 12 pages.
International Preliminary Report on Patentability received for PCT Patent Application No. PCT/FI2017/050959, dated Jul. 9, 2020, 10 pages.
International Search Report and written Opinion received for PCT Patent Application No. PCT/FI2016/050519, dated Nov. 14, 2016, 14 pages.
International Search Report and written Opinion received for PCT Patent Application No. PCT/FI2016/050855, dated Mar. 30, 2017, 18 pages.
International Search Report and written Opinion received for PCT Patent Application No. PCT/FI2017/050959, dated Sep. 27, 2018, 14 pages.
Non-Final Office Action received for U.S. Appl. No. 15/518,510, dated May 8, 2019, 8 pages.
Non-Final Office Action received for U.S. Appl. No. 15/580,751, dated Feb. 13, 2020, 9 pages.
Non-Final Office Action received for U.S. Appl. No. 16/464,310, dated Aug. 20, 2020, 24 pages.
Notice of Allowance received for U.S. Appl. No. 15/580,751, dated Jun. 22, 2020, 8 pages.
Notice of Allowance received for U.S. Appl. No. 16/464,310, dated Apr. 27, 2020, 10 pages.
Notice to File a Response received for Korean Patent Application No. 10-2017-7011848, dated May 20, 2019, 8 pages (English Translation Only).
Office Action received for Brazilian Patent Application No. 112019000361-4, dated May 28, 2020, 8 pages (Official Copy Only) (See Communication under 37 CFR § 1.98(a) (3)).
Office Action received for Canadian Patent Application No. 3,026,330, dated Oct. 17, 2019, 3 pages (English Translation Only).
Office Action received for Chinese Patent Application No. 201680003642.4, dated Dec. 25, 2018, 8 pages (English Translation Only).
Office Action received for Chinese Patent Application No. 201680091463.0, dated Sep. 26, 2020, 16 pages (12 pages of English Translation and 4 pages of Official Copy).
Office Action received for European Patent Application No. 16852879.2 dated Jul. 5, 2018, 5 pages.
Office Action received for European Patent Application No. 16852879.2 dated Mar. 6, 2019, 5 pages.
Office Action received for Japanese Patent Application No. 2017-525528, dated Aug. 21, 2018, 3 pages (1 page of English Translation and 2 pages of Official Copy).
Office Action received for Japanese Patent Application No. 2017-525528, dated Mar. 15, 2019, 2 pages (English Translation Only).
Office Action received for Japanese Patent Application No. 2019-530826, dated Aug. 11, 2020, 16 pages (9 pages of English Translation and 7 pages of Official Copy).
Office Action received for Korean Patent Application No. 10-2017-7011848, dated May 20, 2019, 7 pages (English Translation Only).
Office Action received for Korean Patent Application No. 10-2017-7011848, dated Nov. 27, 2019, 2 pages (English Translation Only).
Office Action received for Chinese Patent Application No. 201580080775.7, dated Jul. 1, 2020, 15 pages (9 pages of English Translation and 6 pages of official copy).
Search Report received for Taiwan Patent Application No. 106122430, dated Apr. 9, 2020, 2 pages (1 page of English Translation and 1 page of Official Copy).
Kosterin et al., "Tapered fiber bundles for high power applications", Optical Fiber Communication Conference and Exposition and The National Fiber Optic Engineers Conference Technical Digest (CD) (Optical Society of America, 2005, pp. 146-148.
Extended European Search Report received for European Patent Application No. 17935842.9, dated Jul. 15, 2021, 6 pages.
Office Action and Search Report received for Chinese Patent Application No. 201780098050.X, dated Nov. 18, 2021, 26 pages (16 pages of English Translation and 10 pages of official copy).
Office Action received for Japanese Patent Application No. 2020-535955, dated Jan. 4, 2022, 4 pages (1 page of English Translation and 4 pages of Official Copy).
Office Action received for Korean Patent Application No. 10-2020-7019973, dated Dec. 16, 2021, 5 pages (2 pages of English Translation and 3 pages of official copy).

* cited by examiner

LASER PROCESSING APPARATUS AND METHOD

FIELD OF THE INVENTION

The invention relates to a laser processing apparatus and method. In particular, the invention concerns welding of materials by laser processing.

BACKGROUND OF THE INVENTION

When welding metal with a laser beam, the laser beam is typically condensed through a condenser lens into a spot of 100-500 μm to increase energy density and instantaneously heat the workpiece to a temperature of 1500° C. or over so that the workpiece melts. At the same time, an assist gas may be fed to prevent oxidation of the molten metal. A laser beam of a one-micrometer waveband from a solid-state laser or fiber laser realizes a very high optical energy intensity and absorbance on a metallic work compared with a laser beam in the ten-micrometer waveband of a $CO_2$ laser. However, if a one-micrometer waveband laser beam with a Gaussian beam is used with an oxygen assist gas to cut a mild steel sheet workpiece, the melt width on the top face of the workpiece widens unnecessarily and impairs kerf control. In addition self-burning may occur which deteriorates the quality of the laser cutting.

Use of ring-shaped laser beams, which provide an intensity profile that can be described as having an annular or "doughnut"-like shape is known in the field of laser materials processing. It has been observed that cutting of a metal of a given thickness can be performed at much lower power levels when using a doughnut beam instead of more conventional beam profiles, which may improve cutting speed and quality.

U.S. Pat. No. 8,781,269 discloses various arrangements to direct laser beams to a multi-clad fiber to generate different beam profile characteristics of an output laser beam, where an input laser beam is electively coupled into an inner fiber core or into an outer ring core.

Such materials processing applications strive to maximize the brightness of the laser beam. Brightness is defined as the power per unit solid angle and unit area. As an example of the importance of brightness, by increasing the brightness of a laser beam the processing speed or the material thickness can be increased. High brightness laser beams can be obtained from e.g. fiber lasers and thin disc lasers. Direct diode lasers have constantly also improved in brightness, but commercial direct diode lasers for materials processing do not quite yet reach the brightness of fiber or thin-disc lasers.

In laser welding according to prior art, the penetration of the laser beam may vary along the weld seam, resulting in an irregular or rough weld seam. There is therefore a need for improved methods and devices for laser welding.

SUMMARY OF THE INVENTION

The invention is defined by the features of the independent claims. Some specific embodiments are defined in the dependent claims.

According to one aspect of the invention a laser welding apparatus comprises: at least one first laser device, each providing at least one first optical feed fiber with a first laser beam; at least one second laser device, each providing at least one second optical feed fiber with a second laser beam; means for generating a composite laser beam comprising a first output laser beam and a second output laser beam for welding a workpiece; wherein the first output laser beam has a circular cross-section and the second output laser beam has an annular shape concentric to the first output laser beam. The second laser device is a fiber laser device or a fiber-coupled laser device. The apparatus is configured to form the second output laser beam at least on the basis of the second laser beam, and the second output laser beam comprises a first wavelength and a second wavelength having difference of at least 10 nanometers, or the second output laser beam has spectrum width of least 10 nanometers.

According to a second aspect of the invention, a method for welding a workpiece with a laser beam comprises the steps of:
providing at least one first laser beam from at least one first optical feed fiber connected to at least one first laser device;
providing at least one second laser beam from at least one second optical feed fiber connected to at least one second laser device;
generating a composite laser beam comprising a first output laser beam and a second output laser beam for welding a workpiece; wherein the first output laser beam has a circular cross-section and the second output laser beam has an annular shape concentric to the first output laser beam, the second output laser beam (2) is formed at least on the basis of the second laser beam by a fiber laser device or a fiber-coupled laser device, the second output laser beam (2) comprises a first wavelength and a second wavelength having difference of at least 10 nanometers, or the second output laser beam (2) has spectrum width of least 10 nanometers.

According to an embodiment, the wavelength of the second output laser beam is 800-815 nm.

According to an embodiment, the first laser device comprises a fiber laser device and the second laser device comprises a fiber-coupled diode laser device.

According to an embodiment, the laser processing apparatus and the composite laser beam are adapted for welding aluminum plates having thickness between 1-20 mm.

According to an embodiment, there is provided a control unit functionally connected to the first and second laser devices, to individually control power density in the first and/or second output laser beams.

Next, embodiments of the invention are described in more detail with reference to the attached drawings.

BRIEF DESCRIPTION OF THE DRAWINGS

In the following, the invention is described in detail with reference to the attached drawings, wherein.

DETAILED DESCRIPTION OF EMBODIMENTS

There are now provided a method and apparatus enabling to improve welding quality. This is achieved by applying a specific composite laser beam configuration illustrated further below.

Figure 1A:
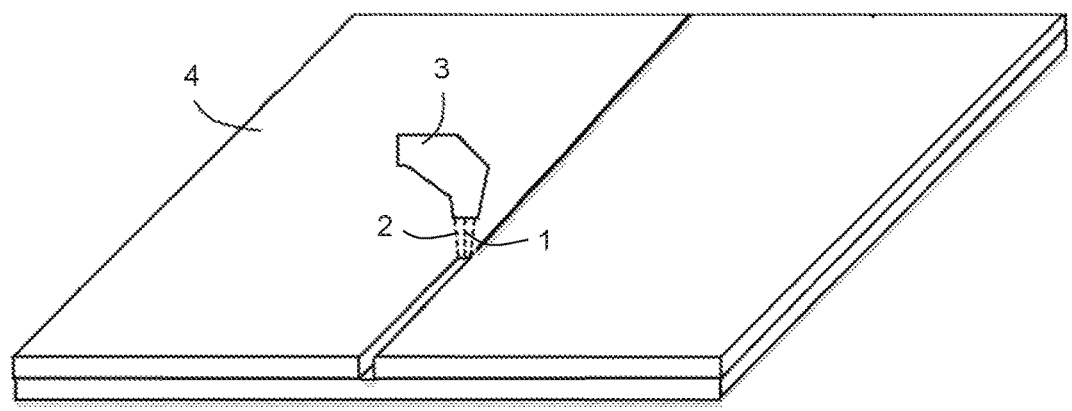
FIGS. 1A and 1C illustrate examples of laser welding operation according to some embodiments of the present invention.

With reference to FIG. 1A, the present features may be applied in a method and apparatus wherein a first laser output beam 1 having a substantially a circular cross-section and a second laser output beam 2 with a substantially annular shape concentric to the first laser output beam are applied from a laser processing head 3 to workpiece 4 parts to be welded. The first output laser beam 1 may thus be referred to as circular or center beam, and the second output laser beam 2 as annular or ring beam.

Figure 1B:
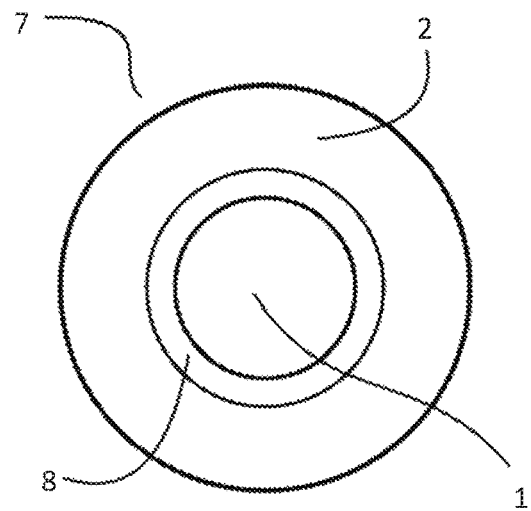
FIG. 1B illustrates cross-section of a composite laser beam according to some embodiments of the present invention.

In FIG. 1B is illustrated the structure of a composite laser beam 7 emerging from the laser processing head 3 to the workpiece 4. The annular outer ring beam 2 is carrying laser power provided by a second laser device. Correspondingly, an inner center beam 1 is carrying the laser power provided by a first laser device.

In some embodiments, the center beam 1 is formed on the basis of a laser beam from a fiber laser (device) and the ring beam 2 is formed by a fiber laser (device) or a fiber-coupled laser (device). The center beam 1 and the ring beam 2 may be selectively directed to elements to be welded.

Figure 1C:
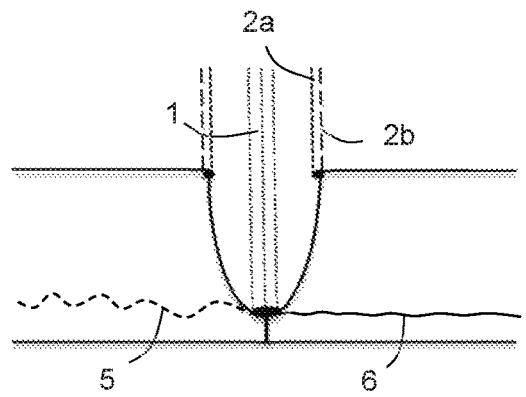

The center beam 1 may be configured to cause a keyhole pattern in the workpiece, as illustrated in FIG. 1c. Between the beams 1 and 2 is an annularly shaped zone 8, which provides only stray or no laser radiation at all.

Figure 2A:
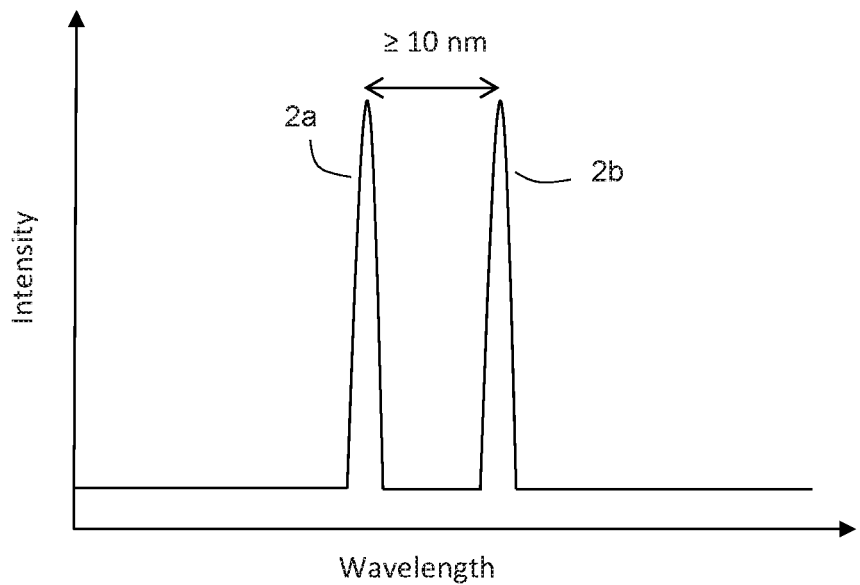
FIGS. 2A and 2B illustrate properties of the second output laser beam according to some embodiments of the present invention.
Figure 2B:
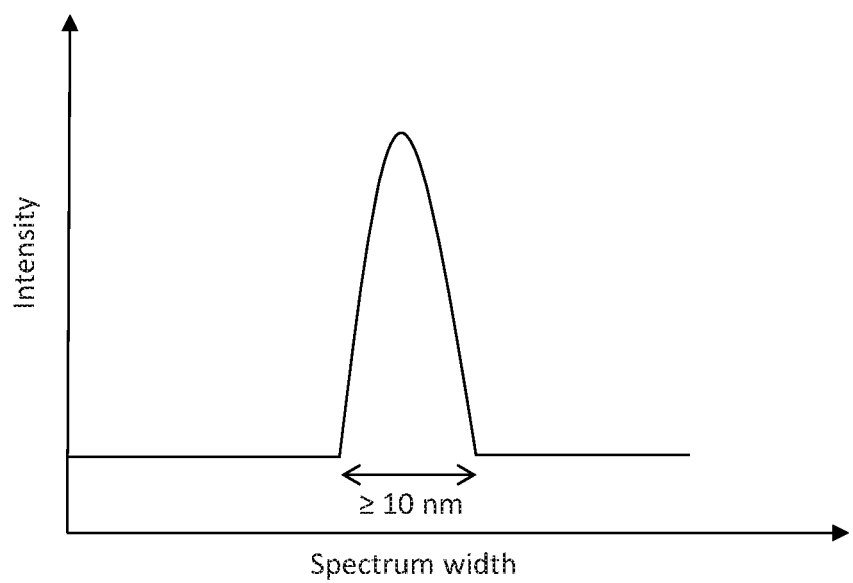

A specific annular beam configuration is applied in the composite laser beam 7 to improve welding quality. In some embodiments the ring beam 2 comprises beams 2a, 2b of two different wavelengths. As further illustrated in FIG. 2A, the ring beam 2 may comprise a first wavelength and a second wavelength having difference of at least 10 nanometers, which may refer to difference in average wavelengths. In some alternative embodiments, with reference to FIG. 2B, the ring beam 2 has spectrum width of at least 10 nanometers, which may refer to total spectrum width of the ring beam 2, which may be formed by one or more beams that in some embodiments may have different wavelengths. It is to be noted that FIG. 2B illustrates only one option for determining the spectrum width and the spectrum width of the ring beam may be defined at a higher intensity level of the intensity peak. The spectrum width in further embodiments does not exceed 100 nm, and it may be selected in the area between 10 nm to 100 nm, such as 10-50 nm.

The present arrangement of applying at least 10 nm difference in average wavelengths or at least 10 nm broad spectrum enables smaller variation in penetration depth along the path of the beam. This is illustrated by line 6 in FIG. 1c with relatively small variation, as compared to line 5 provided without the specific annular beam construction. In addition, the amount of spatter may be reduced and lower porosity can be achieved. Moreover, the ring beam 2 with at least 10 nm difference in average wavelengths or at least 10 nm broad spectrum can be used to remove aluminum oxide from the surface without deformation while welding aluminum and aluminum alloys. This method reduces amount of the aluminum oxide closures and provides better and stronger welding seam quality. In addition, additional preparation before the welding for removing the oxides may be avoided or reduced.

The specific composite laser beam configuration has been tested with different spectrum widths in the ring beam 2. Spectrum width of 10 nm was observed to provide substantially better seam quality and lower porosity than spectrum width of 5 nm. In an example configuration, spectrum width of about 100 nm of the ring beam 2 can be achieved by setting four laser beam sources (in the second laser device output), each with 10 nm spectrum width, at 20 nm intervals. Wavelengths in the region 1030-1090 nm may be applied, for example.

Figure 3:
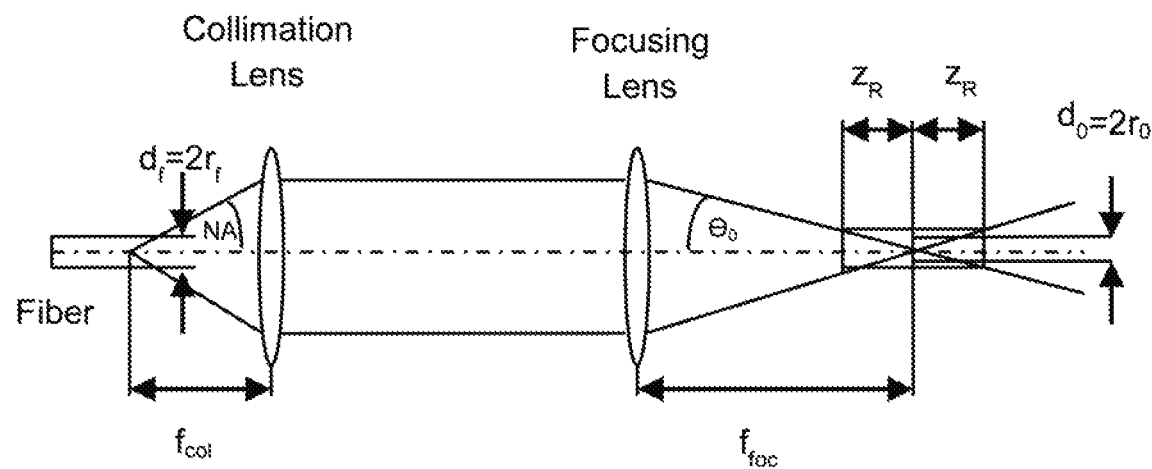
FIG. 3 illustrates an optical arrangement for focusing composite laser beam.

With reference to FIG. 3, an optical system for laser beam transformation is illustrated. Such optical system may be applied in in the laser processing head 3 for the composite laser beam 7 in at least some embodiments.

The focal lengths of the collimation and focusing lenses are $f_{col}$ and $f_{foc}$, respectively, $\Theta_0$ is the convergence angle, $d_0$ is the beam diameter and $Z_R$ is the Rayleigh distance at the focal point on the work piece.

The focal diameter depends on the divergence angle and on the beam-parameter product (bpp) of the focused beam.

$$d_0 = 2r_0 = 2\frac{bpp}{\theta_0} \Rightarrow d_0 = 2\frac{\lambda M^2}{\pi \theta_0}$$

where $M^2$ is a beam ideality factor and $\lambda$ free space wavelength of the beam.

Figure 4:
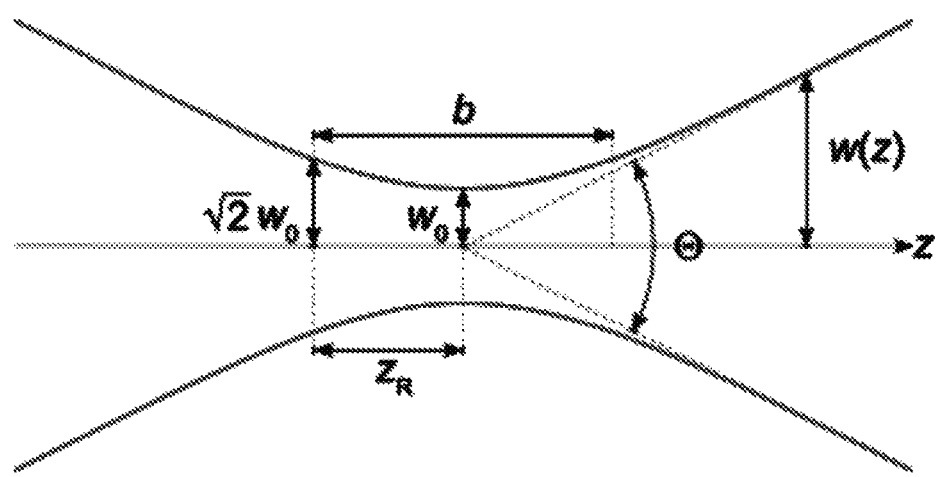
FIG. 4 illustrates beam parameters related to Rayleigh length.

FIG. 4 further illustrates beam parameters related to Rayleigh distance. Rayleigh distance is a suitable scale for assessing focal point shifts Df with wavelength of a spectrally broad laser due to dispersion of refractive index of the materials used in the optics of a processing head. The Rayleigh distance $Z_R$ provides focus length in which laser beam is at the focus. The parameter $b=2Z_R$ can be described as the depth of focus. Rayleigh distance of an ideal Gaussian laser beam is defined by the minimum beam radius at the focus $w_0$ and the wavelength $\lambda$:

$$Z_R = \frac{\pi w_0^2}{\lambda}$$

For non-ideal, or multi-mode, laser beams the Rayleigh distance is smaller than that of an ideal Gaussian beam by a factor $M^2$. When $Df \ll Z_R$, the focus distance changes caused by the different wavelengths of the beam may not have significant effect on the laser processing quality. On the other hand, when $Df \sim Z_R$ or $Df > Z_R$, the width of the wavelength spectrum may have a significant effect on the laser welding quality. It is noted that also the thickness of the processed material affects the quality.

Figure 5:
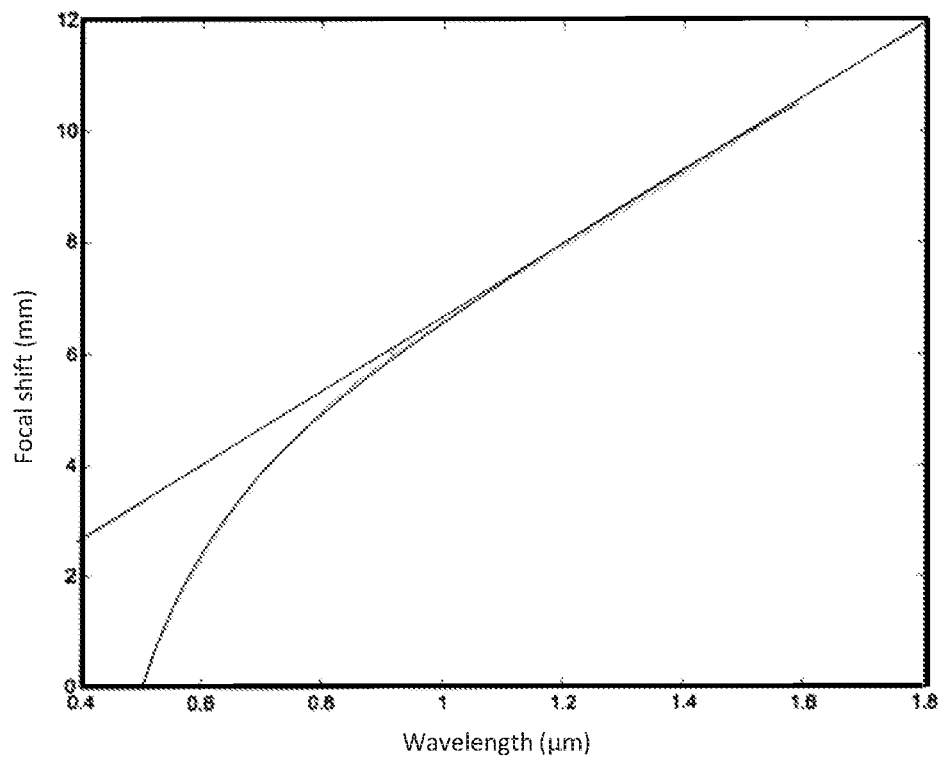
FIG. 5 illustrates simulation results for focal shift.

FIG. 5 illustrates simulation results for focal shift due to dispersion of refractive index of a single lens element made of fused silica. In the example, when laser welding with 250 mm focus lens, 0.1 mm focal shift may be achieved with 15 nm difference in wavelengths of the first wavelength 2a and the second wavelength 2b of the second output laser beam. When using multiple lens elements as in typical processing heads, the focal shift due to dispersion will also increase compared to the single element case.

The power level for the fiber or the fiber-coupled laser (device) may be controlled upon needs of the application in question, from 0 to 10 kW or even more. In many applications fiber laser output power levels around 1 to 4 kW for the ring beam 2 may be applied.

The present specific composite beam configuration enables to apply lower power levels for welding compared to when conventional laser beams are used. In an example embodiment, the laser power may be 600 W for the center beam 1 and 1 kW for the ring beam 2 with 100 mm/s welding speed for welding aluminum (example given for 3000 series aluminum). With these parameters 1 mm penetration depth and very good laser welding quality can be achieved.

The length of the melt pool of the laser welding seam may be optimized with the present specific composite beam configuration by appropriately controlling the welding parameters of the center 1 and the ring beam 2. Spatter can be substantially reduced by optimizing the length of the melt pool and minimizing turbulent flow within the melt pool. In addition, by optimizing the length of the melt pool, sufficient time can be given for gases and bubbles to escape the melt before the melt solidifies. This facilitates lower porosity and reduced number of voids in the weld seam.

In some embodiments, wavelength of the fiber or fiber-coupled laser in the ring beam 2 is in the region of 1030-1090 nm. The wavelength of the fiber laser in the center beam 1 may be selected depending on the application in question, in some embodiments in the area of 700-1200 nm, such as 1070 nm, for example.

In some embodiments, the laser processing apparatus and the composite laser beam is adapted for welding aluminum plates. The aluminum plates may have thickness between 1-20 mm, preferably 1-10 mm. Wavelength(s) of the ring beam 2 in the region of 800-1100 nm may be selected, for example. Wavelength of 808 nm in the ring beam 2 enables to obtain particularly good quality welding results at least when welding 6000 series aluminum alloy pieces due to absorption peak at the wavelength of 808 nm.

In some other embodiments, the second output laser beam 2 may comprise fiber-coupled diode laser beam. Addition of appropriate fiber-coupled diode laser beam in the ring beam 2 facilitates increase in the absorption of the light power of the composite laser beam 7.

In an embodiment, combination of fiber and diode lasers is applied to form the ring beam 2. For example, one of light sources (of the second laser device or a further third laser device) for the ring beam 2 may emit diode light. This enables to further improve stability of penetration depth, as also illustrated by line 6 in FIG. 1c with relatively small variation, as compared to line 5 provided without the diode laser device for the annular beam. Beam 2a may in such embodiment refer to fiber laser beam and 2b to diode laser beam. In some embodiments, wavelength of the diode laser beam is in the area of 0.5 to 1.5 μm in the ring beam. In some embodiments, diode laser output power level in the range of 10 to 50 W is applied for the ring beam 2. In some embodiments the fiber beam and the diode beam in the ring beam and the power levels thereof may be independently adapted.

There are thus various advantages achievable by applying the presently disclosed features and applying added diode light for composite laser beam welding. One advantage is that welding seam quality and uniformness can be improved. The specific configuration of the diode light in combination of the fiber laser in annular ring enables improvement in welding quality. Further, since more stable melt pool of the material being processed can be achieved, this enables to reduce spatter.

Figure 6:
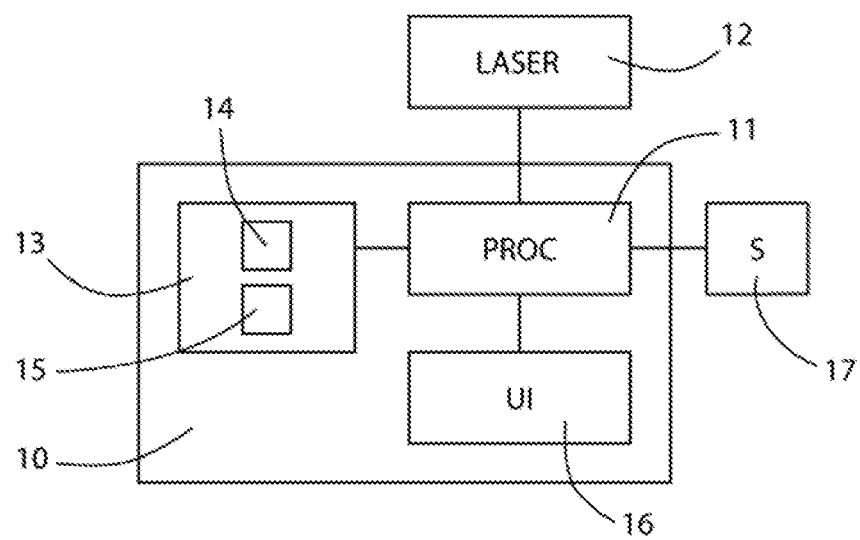
FIG. 6 illustrates a control unit for laser beam profile power control according to some embodiments of the present invention.

FIG. 6 illustrates a control unit 10 according to some embodiments for controlling generation of center 1 and ring beams 2 of a laser apparatus. The control unit 10 is connected directly or indirectly to at least one laser unit 12 adapted to generate the center beam 1 and/or the ring beam 2. The control unit 10 may comprise a general-purpose computer provided with appropriate software for power control or the control unit may comprise a microcontroller. The control unit comprises at least one processor 11, which may be a single- or multi-core processor, wherein a single-core processor comprises one processing core and a multi-core processor comprises more than one processing core. The processor may comprise at least one application-specific integrated circuit, ASIC. The processor may be means for performing method steps in the device. The processor may be configured, at least in part by computer instructions, to control presently illustrated specific composite beam configuration and profile(s).

The control unit device may comprise memory 13. The memory may comprise random-access memory and/or permanent memory. The memory may comprise at least one RAM chip. The memory may comprise solid-state, magnetic, optical and/or holographic memory, for example. The memory may be at least in part accessible to the processor. The memory may comprise computer instructions 14 that the processor 11 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory 13 may be at least in part comprised in the processor. The memory may 13 be at least in part external to the device but accessible to the control unit device.

The presently illustrated features may be caused by at least one computer program stored in the memory 13 and comprising instructions, when executed in the processor 11, to cause the processor to control the configuration of the laser beams 1, 2a, 2b by respective output control signals to the laser unit(s) 12. The memory 13 may also store various parameters 15 affecting properties of the ring beam 2 and/or center beam 1 controlled by the processor, such as parameter sets defining different center and/or ring beam parameters and different welding profiles and programs adjustable by an operator.

The control unit device may comprise user interface, UI 16. The UI may comprise at least one of a display, a keyboard, a touchscreen, for example. The control unit may be arranged to control the laser beam configuration and/or parameters at least partly on the basis of user input. The control unit 10 may be connected also to one or more sensors 17, such as a sensor monitoring progress of the laser welding operation and/or a sensor detecting properties of the workpiece being processed. The control unit 10 may comprise also other units, such as a transmitter and a receiver configured to transmit and receive information in accordance with at least one cellular or non-cellular standard.

According to some embodiments, the control unit 10 may be configured to individually control power densities in the center beam 1 and/or the ring beam 2, regardless of the state of the other beam. The relation between the power density of the center beam 1, and power density of the ring beam 2 may be controlled in accordance with thickness of the workpiece being welded. For example, the control unit 10 may be configured to switch off the ring beam in response to the thickness of the workpiece falling under predetermined thickness limit value for switching off the ring laser beam. In some embodiments, the limit value is selected from the range of 4 to 8 millimeters, in one embodiment 6 mm. Different power densities and relation between the center beam 1 and the ring beam 2 may be controlled depending on the material being welded.

There are also other welding parameters that may be controlled by the control unit 10. Some examples of such parameters include, but are not limited to: welding progression speed, diameters of the center and/or ring beam, modulation on/off, modulation parameters, and other beam properties.

The embodiments may be applied for spot welding and continuous welding applications. In case of continuous welding, the leading edge of the ring beam 2 in the direction of movement of a laser processing head causes a first intensity peak and the rear edge of the ring beam 2 causes a second intensity peak. Hence, the elements are heated in stages and the intensity level of the rear and leading edge may be lower as compared to single spot beam to cause adequate melting. In addition to pre-heating, the leading edge also provides contaminant ablation. This enables to avoid sharp temperature change and avoid or at least reduce subsequent tempering and thus weaker areas caused by the sharp temperature change. The use of the ring beam in continuous welding is also advantageous in avoiding spatter. In an embodiment, power density of the center beam 1 may be set as low or the center beam may be even closed completely. Thus overheating may be avoided.

The composite laser beam 7, i.e. a hybrid of the center beam 1 and the ring beam 2 may be generated by combining laser beams from the originating laser devices and feed fibers in a multi-core optical fiber, from which a resulting composite laser beam with the center beam 1 and ring beam 2 may be directed to the workpiece. A first optical feed fiber may be aligned with a first core of the multi-core optical fiber and a second optical feed fiber may be aligned with a second core of the multi-core optical fiber. The first core of the multi-core optical fiber has a circular cross-section and the second core has an annular shape concentric to the first core. Some further example embodiments are illustrated below.

In some embodiments, also with reference to the illustration of FIG. 1c, keyhole laser welding is applied in combination with heat conduction welding to provide dynamically adaptable center and ring laser beam profiles. Heat conduction welding is applicable for welding metal sheets typically up to a material thickness of approximately 2 mm. A metal sheet which is processed by a laser capable of conduction welding, impacts a relatively shallow but wide spot of the metal. A typical keyhole pattern is caused by a high brightness laser, such as a fiber laser. The diameter of the keyhole may be in the region of less than a millimeter, 0.1 millimeter for example, and the diameter of the spot may be in the region of several millimeters, such as 3 millimeters, for example. When comparing pure keyhole welding and application of hybrid welding by circular and annular laser beams it has been noted that the hybrid welding penetration is at least 20% deeper than that of pure keyhole welding using the same processing speed.

Figure 7:
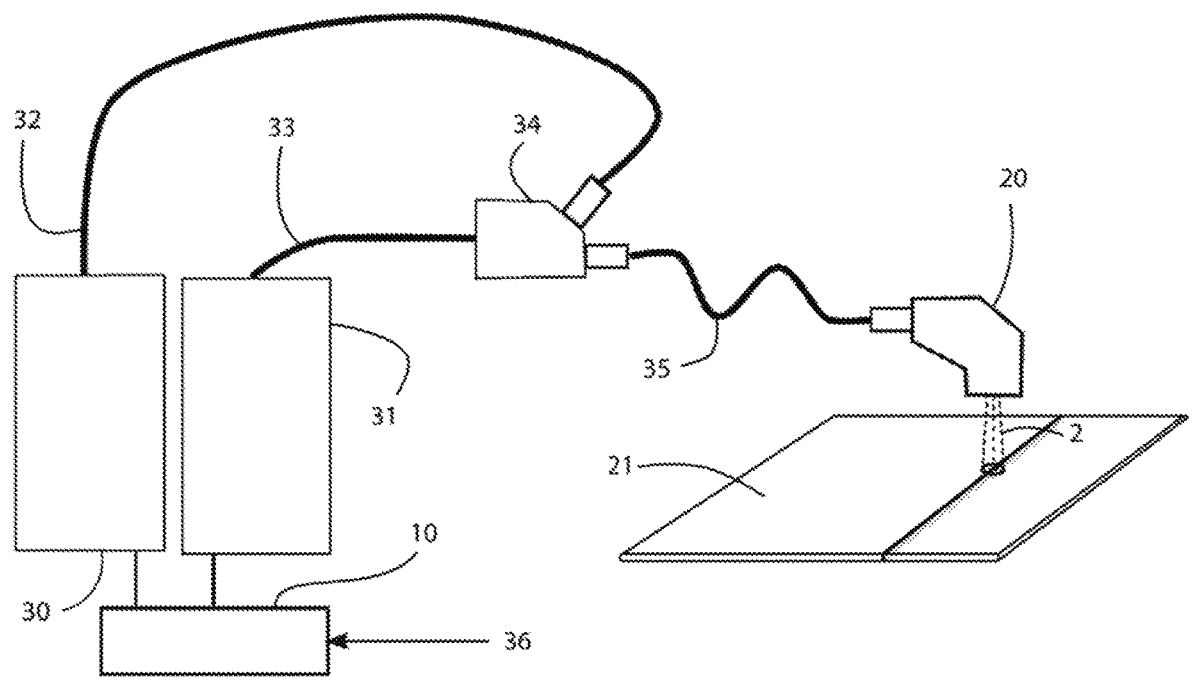
FIG. 7 shows an example of an apparatus according to some embodiments of the present invention.

FIG. 7 shows one embodiment of an apparatus enabling independent center and ring beam power control and in and by which at least some of the above illustrated features on the specific composite laser beam configuration may be applied. A first laser (device) 30 is connected with an optical feed fiber 32 to a laser beam combiner 34. Likewise, one or several second lasers 31 are connected with a feed fiber 33 to the beam combiner 34. The task of the combiner is to arrange all incoming laser beams so that they can be coupled to a dual core optical fiber 35. Thus, the hybrid nature of the laser apparatus is the result of having two laser beams propagating inside a single dual-core optical fiber 35. The two laser beams inside the fiber 35 have typically different brightness and intensity profiles, and may have different wavelengths. Furthermore, the power levels in the two laser beams may be independently and continuously controlled by adjusting the power levels from the first laser 30 and the second laser device 31.

In order to achieve a sufficient brightness of the beam, the first laser device 30 may be a high-brightness fiber laser comprising diode-pumped single or multiple fiber laser oscillator or master oscillator-power amplifier (MOPA) modules, each consisting of fiber-coupled diode lasers coupled to a fiber resonator, for example. Further examples of high-brightness lasers are fiber-coupled thin-disc lasers or Nd-YAG lasers, which are pumped with light from diode lasers. Modern laser technology frequently relies on light as energy transfer medium, as many active solid-state light amplification materials are insulators. Diode lasers have replaced previously used flash lamps as energy pumps because of their higher efficiency and narrower light spectrum.

Figure 8A:
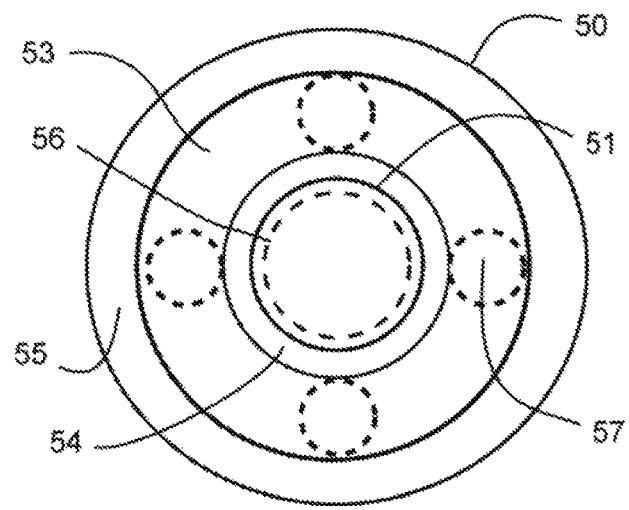
FIG. 8A shows a cross-section of a receiving end of coupling means according to some embodiments.

The second laser device 31 may be configured to provide the specific second laser beam(s) for forming the ring beam 2 configuration as above illustrated. The second laser device 31 may a fiber laser or a fiber-coupled laser that may also comprise a solid-state laser resonator pumped by diode lasers, e.g. a thin-disc laser resonator (not shown). The dual core optical fiber 35 may be arranged to carry the laser beam from the first laser device 30 in its center core and the beam generated by one or multiple second laser device 31 in an outer core which is arranged annularly around the center core, at a distance from the center core, as illustrated in FIG. 8A.

In some embodiments, both first and second laser devices 30, 31 are fiber lasers, each having independently controllable power levels. Some lasers are fiber lasers by construction and inherently feed the light into an optical fiber; others need to be optically interfaced with a fiber in order to align the laser beam to the core of the output fiber. The purpose of the laser apparatus and the power ratings and other properties of the individual laser modules determine which types of lasers are feasible to be connected to the beam combiner 34.

In some embodiments, the apparatus comprises a further diode laser device (not shown) providing a diode laser beam to the beam combiner 34. The beam combiner 34 is adapted to align the diode laser beam with the at least one second core of the multi-core optical fiber.

The dual core optical fiber is at its opposite end connected to a laser processing head 20 which guides a combined or composite laser beam 7 onwards to a workpiece 21. The laser processing head 20 usually comprises collimating and focusing lenses to produce an image of the intensity profile emerging from the end of the fiber 35 onto the workpiece 21 with a desired size, as determined by the focal lengths of the lenses. The task of the laser head 20 may also be to provide a pressurized gas jet to a welding line. Pressurized gas may also be applied to further protect the optics within the laser head 20 from spitting molten metal, and also removes it from the welding line helping to keep it clean. In one embodiment, oxygen assist gas is applied at least in connection with welding progression turning points, providing additional energy and enabling to further improve the welding edge quality in these points.

In one embodiment of the invention, the apparatus is provided with a control unit, such as the control unit 10 illustrated above. The control unit may also be integrated in one of the laser devices 30 or 31. Alternatively, all units 30, 31 and 10 may be placed in a single housing and be integrated with each other in their construction, for convenience and reliability. As indicated, the control unit 10 may be used to perform independent power control of the ring 2 and central 1 beam's profiles, and to enable dynamically adjustable ring-center beam which can be adjusted on-the-fly by applying at least some of the above-illustrated features. The control unit may be configured to control modulation and/or other parameters of at least one of the laser devices 30, 31. Preferably the modulation of the both laser beams can be dynamically controlled separately. Hence, a large variety of different welding applications and purposes becomes possible by the same apparatus. The beam profile may be dynamically adjusted to fit variety of demands of challenging welding types/applications, such as different materials, coatings and/or thicknesses.

The control unit 10 may be arranged to receive feedback 36 from the user of the laser head 20, or automatic feedback e.g. from light intensity sensors. The feedback or input is then used to control the power of the lasers 30 and 31 to follow predetermined targets, or to adjust the laser power according to the resulting welding result observed at the workpiece 21. The control unit 10, or another control unit, may also control other functions of the apparatus, such as the movement of the laser processing head 20 in relation to the workpiece.

According to present invention, the beam combiner 34 is made of fused silica components where optical power is propagating inside fused silica through the entire combiner structure, and the combiner has optical fibers at the input and output. Therefore, in the present invention the beam combiner 34 can be referred to as an all-glass fiber combiner.

In FIG. 8A is shown a cross-section of an example dual/multi core optical fiber 50, having a central core 51 with a primary cladding 54. The outer core 53 is spatially formed by the inner cladding 54 and the outer cladding 55. As is clear to one familiar with the art, the cladding is defined as a material having a lower refractive index than that of the core. For example, the diameter of the central core 51 may be 70 µm, and the inner and outer diameters of the outer core 53 may be 100 µm and 180 µm, respectively. The central and peripheral cores 51 and 53 may also take other forms than those described above. The central core 51 may be of a square or rectangular shape, for instance. The peripheral core 53 may also have rectangular boundaries or be composed of multiple segments of linear or circular shapes.

With dashed lines is shown how the cores of the ends of fused feed fibers 56 and 57 (fibers 72 and 71 in FIG. 9) from the beam combiner may align with the cross-section of the dual core optical fiber 50. For example, each of the four feed fibers 57 aligned to the peripheral core 53 (for forming the ring beam 2) may have 10 nm spectrum width, at 20 nm intervals, resulting to total spectrum width of about 100 nm for the ring beam 2.

The laser radiation in the central core 51 of the dual core optical fiber 50 has a central and narrow spatial intensity profile, while the intensity distribution in the outer core 53 is taking the shape of a doughnut. This spatial intensity pattern is further imaged with processing optics in the laser head 20 onto the workpiece. With this configuration, the beam quality of the laser beam is relatively high both in the center and outer cores.

Figure 8B:
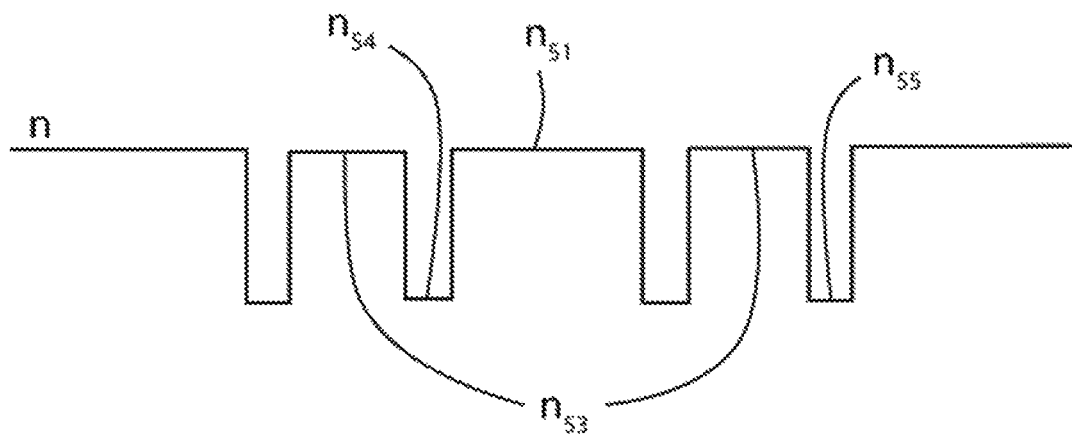
FIG. 8B illustrates the refractive index profile at the output of coupling means according to some embodiments.

Referring now to FIG. 8B, an example refractive index profile of an optical dual core fiber 50 is shown. The cores 51 and 53 have a refractive index $n_{51}$ and $n_{53}$ that is higher than the indexes $n_{54}$ and $n_{55}$ of the encircling materials 54 and 55 respectively. In this way the laser beam is guided to a workpiece with the least possible degradation in the annular intensity profile and attenuation of the optical power and intensity in each of the cores.

The refractive index of fused silica can be adjusted by doping it with impurities. Doping fused silica with germanium results in an increase of the refractive index, while doping it with fluorine results in reduction of the refractive index. Therefore the cores 51 and 53 may be made of Ge-doped or un-doped fused silica, and their primary claddings 54 and 55 of F-doped fused silica, for example.

Figure 9:
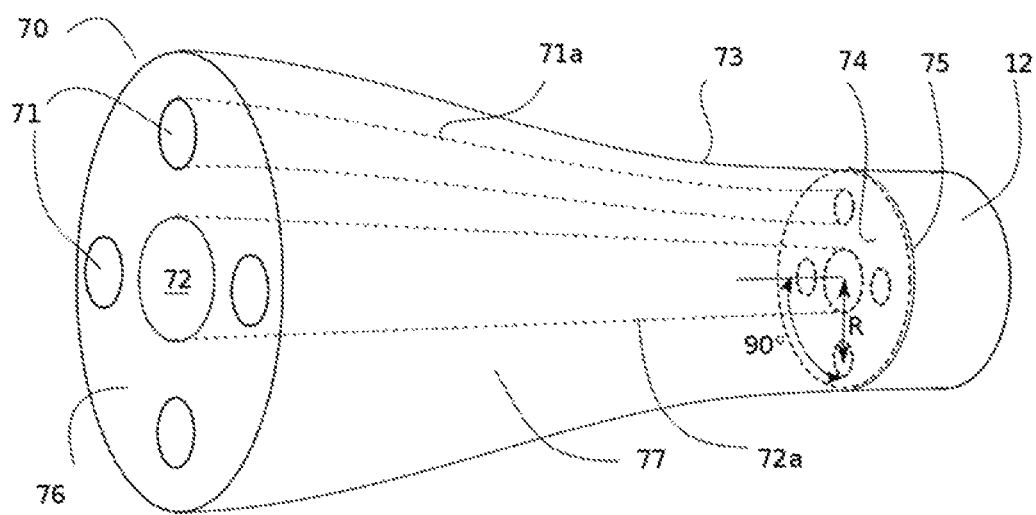
FIG. 9 shows schematically an optical component according to an embodiment.

In FIG. 9 is shown the key optical component 70 of the fiber combiner 34. It is a multi-bore capillary tube having a body portion consisting of a fused silica glass tube 77, an input end 76 for receiving laser beams (not shown) carried by optical feed fibers 71 and 72 from at least two laser devices (e.g. fibers 32 and 33 from devices 30 and 31). It also has an opposite output end 74 for delivering a composite output laser beam consisting of at least two laser beams aligned with each other in the same direction.

The optical feed fibers 71, 72 entering at the input end 76 extend through the body portion in capillary bores to the output end 74, and are fused with the glass tube 77 to form a component consisting of light guiding cores 71a, 72a and encircling glass material. The cores have refractive index that is higher than the refractive index of the encircling glass material around the cores to provide for propagation of optical power in the cores through the entire component by means of total internal reflection.

To show the principle of the fiber combiner, the dimensions of the cores and the dimensions of the component 70 are not in scale, and for clarity, only a couple of the cores are shown with dashed lines.

An optical component 70 may be manufactured by e.g. drawing. In this example, there may be a larger bore for the fiber 72 of about 300 µm in diameter in the center and four smaller bores for fibers 71 placed symmetrical and peripheral to the center bore 72. The smaller bores may have a diameter of about 150 µm, for example. The outside diameter of the capillary tube may be 1 mm, for example. The material of the tube may be fused silica, for instance. The fibers, whose outer cladding of bulk glass (not shown) has preferably been etched away at least partly, are inserted into the middle bores and pushed through to a waist part 73 of the capillary taper. When the fibers are in place, the capillary tube 70 is heated at the waist section 73 to fuse the fibers to the tube and to form a first central light guiding core 72a and second light guiding cores 71a, which all extend through the optical component 70.

The fibers 71, 72 may as an alternative have an inner core of pure fused silica material and an outer cladding of F-doped fused silica. In this way, the fused silica glass tube 77 of the optical component 70 may be manufactured from pure fused silica, because the light-guiding cores of the fibers are inherently surrounded by material with a lower refraction index. This means that the light remains in the cores 71a, 72a even if the refractive index of the capillary tube is the same as in the fiber cores. In this case, the outer fiber cladding of bulk glass may be etched away down to the F-doped cladding, or even further, as long as some F-doped cladding remains around the pure or Ge-doped inner fiber core.

The fused cores 71a, 72a (shown with dashed lines) and tube 70 is then cut off or cleaved to create an end surface 74. A dual core fiber 35 like the one shown in FIG. 8 may then be welded to the capillary tube at the end 74, resulting in a seam 75.

In preferred embodiments, the center of the first optical feed fiber 72 is aligned with the center of the component 70, and the centers of, for example, four second optical feed fibers 71 are located to provide an output beam at the output end 74 at a predefined distance R from the first central light guiding core 72a. It is to be appreciated that the number of second feed fibers is not as such limited, but instead 8, 16 or 32 instead of 4, for example. The second light guiding cores 71a are preferably arranged symmetrically with respect to the central core 72a, to provide output beams with an angular distance of 90° between each other.

The presently disclosed laser welding method and apparatus may be applied in a large variety of applications. Particular advantages are achieved in applications where there is need to achieve excellent welding surface quality for laser-welding materials with differing properties, such as thicknesses, and/or changing and multiform welding operations. A single welding apparatus may now be used for these varying properties/requirements, enabling to instantly adapt to optimal welding beam profile accordingly. As some examples, the present system can be particularly advantageous for welding needs of automobile industry.

It is to be understood that the embodiments of the invention disclosed are not limited to the particular structures, process steps or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A laser welding apparatus comprising:
   at least one first laser device, each first laser device providing at least one first optical feed fiber for delivering a first laser beam;
   at least one second laser device, each second laser device providing at least one second optical feed fiber for delivering a second laser beam; and
   a beam combiner connected to said at least one first and said at least one second optical feed fibers and to a multi-core optical fiber, said multi-core optical fiber having a first core with a circular cross-section located in a center of the multi-core optical fiber and a second core with an annular cross-section spaced from and concentric to the first core, wherein said at least one first optical feed fiber is aligned with the first core of said multi-core optical fiber, and wherein said at least one second optical feed fiber is aligned between an inner diameter and an outer diameter of said annular second core of said multi-core optical fiber;
   said first and second cores being connectable to a laser processing head having a focusing lens to image a composite laser beam comprising a first output laser beam and a second, independent output laser beam to a workpiece to be welded wherein the first output laser beam has a circular cross-section and the second output laser beam has an annular cross-section concentric to and spaced apart from the first output laser beam at the workpiece, wherein
   the second laser device is a fiber laser device or a fiber-coupled laser device,
   the laser welding apparatus is configured to form the second output laser beam at least on the basis of the second laser beam, and
   the second output laser beam comprises a first wavelength and a second wavelength, the first and second wavelengths being generated by different laser sources, the difference between the first wavelength and the second wavelength being at least 15 nanometers, such that an effective focal length of the focusing lens causes a focal shift of at least 0.1 millimeters between images associated with the first wavelength and the second wavelength.

2. The laser welding apparatus of claim 1, wherein a wavelength of the second output laser beam is 800-815 nm.

3. The laser welding apparatus of claim 1, wherein the apparatus comprises a control unit functionally connected to the first and second laser devices, to individually control power density in at least one of the first output laser beam and the second output laser beam.

4. The laser welding apparatus of claim 1, wherein the first laser device comprises a fiber laser device and the second laser device comprises a fiber-coupled diode laser device.

5. The laser welding apparatus of claim 1, wherein the laser welding apparatus and the composite laser beam are adapted for welding aluminum plates having thickness between 1-20 mm.

6. The laser welding apparatus of claim 1, wherein a spectrum width of the second output laser beam is less than 100 nanometers.

7. The laser welding apparatus of claim 1, wherein a wavelength of the second output laser beam is in the region of 800-1100 nm.

8. The laser welding apparatus of claim 1, wherein the second output laser beam comprises a fiber laser beam emitted by a fiber laser device and a diode laser beam emitted by a diode laser device.

9. A method for welding a workpiece with a laser beam, comprising:
generating at least one first laser beam in at least one first laser device and delivering the at least one first laser beam through at least one first optical feed fiber;
generating at least one second laser beam in at least one second laser device and delivering the at least one second laser beam through at least one second optical feed fiber;
combining said first and second laser beams in a multi-core optical fiber, the multi-core optical fiber having a first core with a circular cross-section located in a center of the multi-core optical fiber and a second core with an annular cross-section spaced from and concentric to the first core, by aligning said at least one first optical feed fiber with the first core of said multi-core optical fiber and aligning said at least one second optical feed fiber between an inner diameter and an outer diameter of said second core of said multi-core optical fiber;
focusing, by a focusing lens, an image of a composite laser beam comprising a first output laser beam and an independent, second output laser beam from said multi-core optical fiber to a workpiece to be welded, wherein the first output laser beam has a circular cross-section and the second output laser beam has an annular cross-section concentric to and spaced from the first output laser beam at the workpiece, wherein
the second output laser beam is formed at least on the basis of the second laser beam by a fiber laser device or a fiber-coupled laser device, and
the second output laser beam comprises a first wavelength and a second wavelength, the first and second wavelengths being generated by different laser sources, the difference between the first wavelength and the second wavelength being at least 15 nanometers, such that an effective focal length of the focusing lens causes a focal shift of at least 0.1 millimeters between images associated with the first wavelength and the second wavelength.

10. The method according to claim 9, wherein the power density in the first and second output laser beams is controlled individually by a control unit which is functionally connected to at least one of the first laser device and the second laser device.

11. The method of claim 9, wherein a wavelength of the second output laser beam is 800-815 nm.

12. The method of claim 9, wherein the first laser device comprises a fiber laser device and the second laser device comprises a fiber-coupled diode laser device.

13. The method of claim 9, wherein a spectrum width of the second output laser beam is less than 100 nanometers.

14. The method of claim 9, wherein a wavelength of the second output laser beam is in the region of 800-1100 nm.

15. The method of claim 9, wherein the second output laser beam comprises a fiber laser beam emitted by a fiber laser device and a diode laser beam emitted by a diode laser device.

* * * * *